United States Patent [19]

Müller et al.

[11] 4,210,396

[45] Jul. 1, 1980

[54] ELECTROPHOTOGRAPHIC METHOD AND APPARATUS

[75] Inventors: Jüurgen Müller; Alfred Rheude, both of Munich; Josef Pfeifer, Unterhaching, all of Fed. Rep. of Germany

[73] Assignee: Agfa-Gevaert Aktiengesellschaft, Leverkusen, Fed. Rep. of Germany

[21] Appl. No.: 887,302

[22] Filed: Mar. 16, 1978

[30] Foreign Application Priority Data

Mar. 25, 1977 [DE] Fed. Rep. of Germany ....... 2713335

[51] Int. Cl.[2] ...................... G03G 15/00; G03B 27/02

[52] U.S. Cl. .................................. 355/12; 250/317.1; 355/100; 355/132

[58] Field of Search .................. 355/3 R, 12, 99, 100, 355/132; 354/3, 5, 105; 250/315 A, 317

[56] References Cited

U.S. PATENT DOCUMENTS

| | | | |
|---|---|---|---|
| 2,036,682 | 4/1936 | Cantor | 354/105 |
| 2,689,179 | 9/1954 | Walkup et al. | 355/12 |
| 3,331,276 | 7/1967 | Oliver | 355/12 X |
| 3,612,681 | 10/1971 | Itoh | 355/12 |
| 3,715,156 | 2/1973 | Levy | 355/16 |
| 4,071,648 | 1/1978 | Welkowsky | 250/315 A X |
| 4,074,133 | 2/1978 | Muller et al. | 250/315 A |

*Primary Examiner*—Fred L. Braun
*Attorney, Agent, or Firm*—Kane, Dalsimer, Kane

[57] ABSTRACT

Information on a patient chart is imaged onto a first portion of a dielectric receptor sheet simultaneously with, prior to or subsequent to exposure of a second portion of the receptor sheet to object-modulated X-rays in an ionography imaging chamber. The sheet has an outer layer consisting of polyvinyl chloride or polyethylene terephthalate and is brought into intimate contact with a chart at a station where the chart and the overlapping first portion of the sheet are exposed to electromagnetic radiation issuing from an electronic flash unit. This results in the formation of a latent image of the information on the first sheet portion, and such image is thereupon converted into a visible image, either on the receptor sheet or on a separate sheet, in accordance with a xerographic developing technique by resorting to toner particles. The sheet can be reused by neutralizing its charge, e.g., by heating its layer to a temperature approximately 10° C. above the freezing point of the material of the layer, by moving the sheet relative to an AC corona discharge device (or vice versa), or by washing the layer with alcohol.

31 Claims, 2 Drawing Figures

ELECTROPHOTOGRAPHIC METHOD AND APPARATUS

BACKGROUND OF THE INVENTION

The present invention relates to an electrophotographic method and apparatus. More particularly, the invention relates to improvements in electrophotographic methods and apparatus for making latent images of intelligence on dielectric receptor sheets.

In accordance with presently known electrophotographic techniques, a latent image is obtained by resorting to a corona discharge device which applies a uniform charge to a dielectric receptor sheet and by thereupon effecting a partial discharge as a result of imaging of an object. Alternatively, the latent image is obtained (in a more expensive manner) by resorting to mechanically produced conductivity distribution, to an electronically controlled matrix or the like. The latent image is thereupon converted into a visible image, either on the same sheet or on a separate sheet, with the help of electrostatically attractible toner particles.

OBJECTS AND SUMMARY OF THE INVENTION

An object of the invention is to provide a simple and inexpensive method of imaging information onto dielectric receptor sheets which are in process of receiving, which are about to receive or which are already provided with latent images whereby the information identifies or otherwise pertains to such latent images.

Another object of the invention is to provide a method of the just outlined character which can be practiced in combination with the application of latent images to dielectric receptor sheets in ionography imaging chambers wherein a dielectric receptor sheet is exposed to object-modulated X-rays.

A further object of the invention is to provide a novel and improved dielectric receptor sheet which can be used for the practice of the above outlined method.

An additional object of the invention is to provide a method which takes up a short interval of time, which can be practiced by resorting to simple and compact apparatus, and which insures the development of readily discernible permanent images of originals on dielectric receptor sheets.

An ancillary object of the invention is to provide a method which can be resorted to for the making of permanent records of patient data on dielectric receptor sheets which are exposed to patient-modulated X-rays.

A further object of the invention is to provide a simple and inexpensive apparatus for the practice of the above outlined method.

Another object of the invention is to provide an apparatus which can accept conventional originals and wherein the insertion and/or removal of originals takes up little time and can be carried out by moving the originals in any one of several directions.

A further object of the invention is to provide the apparatus with novel and improved means for properly holding and orienting originals with respect to receptor sheets during imaging of information which is borne by the originals onto the adjacent portions of receptor sheets.

Another object of the invention is to provide a simple and inexpensive imaging device which can be used in the above outlined apparatus to effect the exposure of latent images of information on selected originals onto selected portions of dielectric receptor sheets.

A further object of the invention is to provide an apparatus of the above outlined character which can be readily incorporated into or combined with an ionography imaging chamber for the making of latent images of X-rayed objects.

One feature of the invention resides in the provision of an electrophotographic method of imaging a preferably sheet-like original (e.g., a part of or an entire patient chart) onto a selected portion of a dielectric receptor sheet at least one outer layer or stratum of which consists of polyvinyl chloride or polyethylene terephthalate. The method comprises the steps of placing the original against the selected portion of the receptor sheet, exposing the selected sheet portion and the original to electromagnetic radiation (for example, to radiation issuing from one or more flash lamps and impinging upon that side of the selected portion of the sheet which faces away from the original) to thus provide the receptor sheet with a latent image of information on the original, and converting the latent image into a visible or permanent image (preferably by resorting to a xerographic technique utilizing toner particles). The intensity of electromagnetic radiation is regulated in such a way that the temperature of those zones of the selected sheet portion, which overlie the regions of the original which due to their higher radiation adsorption, are heated more than the surrounding areas, is raised above the freezing point of the material of the stratum (normally above 50° C.) for a relatively short interval of time (e.g., for an interval of less than $10^{-3}$ second). The receptor sheet preferably transmits light; this renders it possible to place the original against one side of the selected sheet portion (adjacent to the exposed surface of the aforementioned stratum) and to expose the other side of the selected sheet portion to electromagnetic radiation.

If the receptor sheet is to be reused, the method further comprises the step of electrostatically neutralizing the sheet. This can be achieved by uniformly heating the selected portion of the sheet for an extended interval of time (e.g., for a period of several seconds) to a temperature which is between the freezing and melting points of the material of the stratum, normally to a temperature approximating or exceeding 60° C. Alternatively, the neutralizing step can include effecting a relative movement between the selected sheet portion and an AC corona discharge device and/or contacting the exposed side of the stratum with a conductive liquid (e.g., alcohol).

As a rule, the exposing step will include heating the stratum to a temperature which is slightly above the freezing point of the material of the stratum (the remaining or main body portion of the sheet may consist of a material which is identical with the material of the aforementioned stratum). If the converting step includes contacting the latent image with toner particles, the interval of heating of the stratum in the course of the exposing step preferably includes heating the stratum for a period of time which is long enough to enable the stratum to accumulate an electrostatic charge just sufficient to attract toner particles to the latent image. The interval should be shorter than that interval upon termination of which the transverse conductivity of the stratum rises to a value at which the electrostatic charge is equalized in the stratum. Also, the aforementioned interval should be shorter than that interval upon termination of which the conductivity of the stratum and the conductivity of the main body portion of the receptor sheet rise to a value at which the electrostatic charge is applied or communicated to and distributed in the main body portion. The aforementioned electrostatic neutralizing step involves (in the event of heating) exposure of the selected portion of the receptor sheet to a temperature above the freezing point but below the melting point of the material of the stratum (this applies for each and every part of the selected sheet portion). Satisfactory results are achieved by heating the selected portion of the sheet to a temperature which exceeds the freezing point by approximately 10° C.

The method may further comprise the steps of exposing another or second portion of the receptor sheet to object-modulated X-rays in the gas-filled interelectrode gap of an ionography imaging chamber to thus provide the second sheet portion with a latent image of such object, and shielding the selected portion of the receptor sheet from X-rays in the course of the last mentioned exposing step. The two exposing steps can be carried out simultaneously or one after the other. The original may contain information pertaining to the object which is imaged onto the second portion of the receptor sheet.

The just discussed method may further comprise the step of converting the last-mentioned latent image into a visible image simultaneously with the first mentioned converting step, i.e., the selected and second portions of the receptor sheet can be developed simultaneously in one and the same developing apparatus, preferably in an apparatus wherein the sheet is contacted by toner particles.

The novel features which are considered as characteristic of the invention are set forth in particular in the appended claims. The improved apparatus itself, however, both as to its construction and its mode of operation, together with additional features and advantages thereof, will be best understood upon perusal of the following detailed description of certain specific embodiments with reference to the accompanying drawing.

DESCRIPTION OF THE PREFERRED EMBODIMENTS

Figure 1:
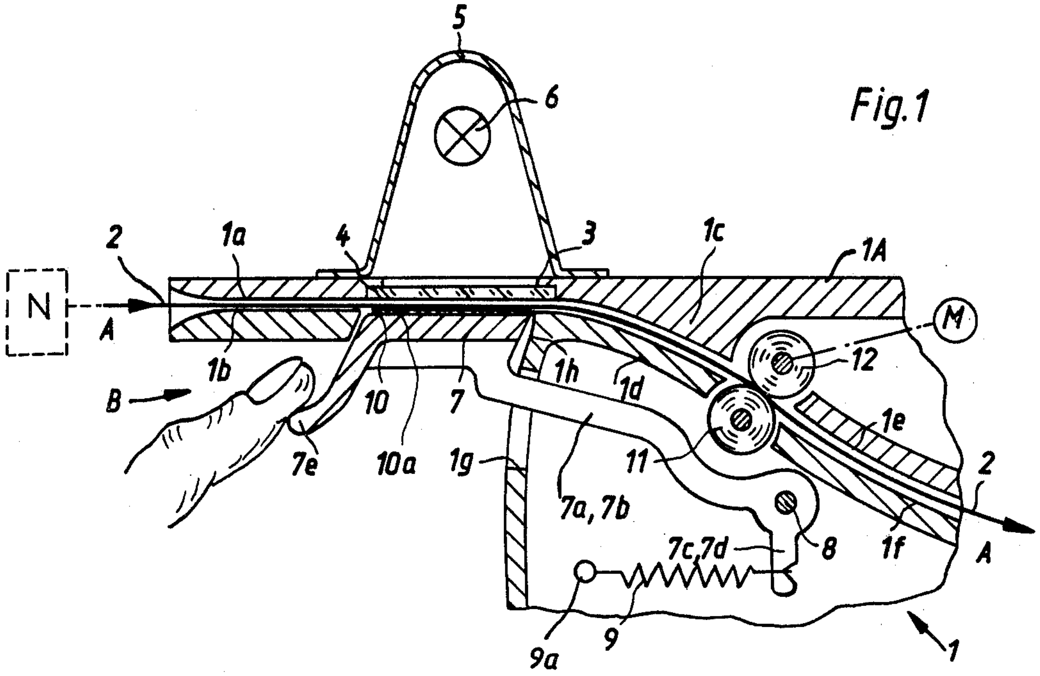
FIG. 1 is a fragmentary sectional view of an apparatus for imaging information onto a selected portion of a dielectric receptor sheet.

FIG. 1 shows an apparatus which images information 10*a* onto a selected portion of a light-transmitting dielectric receptor sheet 2. The information 10*a* is encoded on or otherwise applied to an original 10, e.g., a card or chart containing written and/or printed data pertaining to a patient who underwent or is about to undergo an X-ray examination.

The apparatus comprises a housing 1 including several guide members 1*a*, 1*b*, 1*c*, 1*d*, 1*e*, 1*f* which define an elongated path along which the dielectric receptor sheet 2 is advanced (in the direction indicated by arrows A) by a transporting unit including two rolls 11, 12. The rolls 11, 12 are rotatably mounted in the housing 1, and at least one thereof is driven by an intermittently operated prime mover M, e.g., an electric motor. The housing 1 can form part of or can be placed adjacent to an ionography imaging chamber (e.g., a chamber of the type disclosed in commonly owned U.S. Pat. No. 4,021,668 granted May 3, 1977 to Josef Pfeifer et al.), or it may form part of the developing unit which follows the imaging chamber and wherein latent images are converted into visible images.

The housing 1 includes a top wall 1A which is formed with a rectangular or square light-admitting opening or window 3 containing a light-transmitting pane 4 adjacent to the upper side of a portion of the path for the sheet 2. The pane 4 can be illuminated by a light source 6 which is mounted at a level above the top wall 1A and is partially surrounded by a reflector 5. The light source 6 preferably includes one or more electronic flash units or lamps.

The housing 1 further supports a pressure plate 7 which can be moved toward and away from the underside of the pane 4 opposite the window 3. The pressure plate 7 serves to yieldably bias the original 10 against the adjacent selected portion of the dielectric receptor sheet 2 and is mounted on two levers 7*a*, 7*b*. The levers 7*a*, 7*b* are pivotably mounted on a common shaft 8 which is installed in the housing 1. The shorter arms 7*c*, 7*d* of the levers 7*a*, 7*b* are biased by one or more helical springs 9 which are attached to a post 9*a* in the housing 1. The springs 9 urge the pressure plate 7 toward the pane 4. The longer arms of the levers 7*a* and 7*b* extend through slots 1*g* which are provided in the housing 1 at a level below the window 3. When the springs 9 are free to maintain the pressure plate 7 in the position of FIG. 1, the upper side of the original 10 is urged against and maintained in intimate contact with the underside of the selected portion of the sheet 2 at a level below the pane 4 and window 3.

Figure 2:
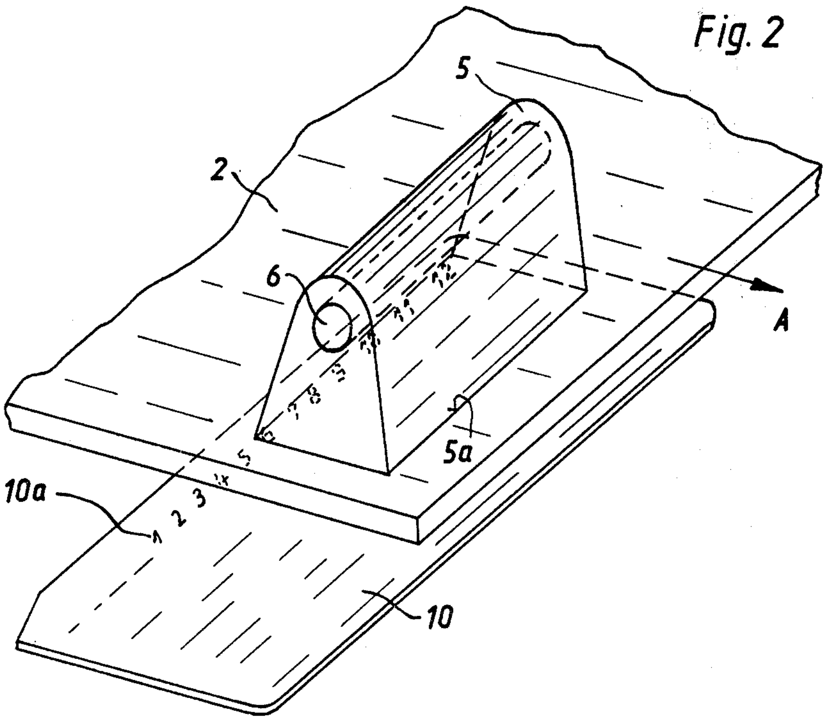
FIG. 2 is a perspective view of a portion of the structure which is shown in FIG. 1.

In order to insert an original 10, the attendant grasps a downwardly extending crosshead 7*e* which extends transversely between the free ends of the longer arms of the levers 7*a*, 7*b* and pivots the levers counterclockwise, as viewed in FIG. 1 so that the pressure plate 7 is moved away from the pane 4. The pressure plate 7 is preferably installed in such a way that a fresh original 10 can be inserted (or a previously imaged original removed) from several sides. For example, a fresh original 10 can be inserted in the direction indicated by arrow B or in at least one direction at right angles to the plane of FIG. 1. Once a fresh original 10 is inserted between the selected portion of the sheet 2 and the pressure plate 7, the latter is returned to the position of FIG. 1 and maintains the original in the position shown in FIG. 2 whereby pertinent information 10*a* is adjacent to that (selected) portion of the sheet 2 which is located below the pane 4. As shown in FIG. 2, the entire original 10 need not register with the selected portion of the sheet 2; it suffices to place into register with the sheet 2 only that portion of the original 10 which bears pertinent information 10*a*, namely, the information which is to be imaged on the sheet 2 adjacent to an object-modulated X-ray image of an object (such X-ray image can be exposed onto a second portion of the sheet 2 which is located ahead or downstream of the window 3). The information which is to be imaged onto the sheet 2 must be placed in register with that portion of the sheet 2 which is below the window 3, i.e., which is exposed to electromagnetic radiation when the circuit of the light source 6 is completed.

The housing 1 has a shoulder 1*h* which is adjacent to the front end of the window 3 (as considered in the direction indicated by arrows A), and such shoulder can serve as a stop or locating means to properly position the original 10 with respect to the pane 4. The position of the sheet 2, i.e., the determination of that portion of the sheet 2 which registers with the window 3 and with pertinent information 10*a* on a properly inserted original 10, is selected by the intermittently driven transporting rolls 11 and 12. When the imaging of information 10*a* onto the sheet 2 is completed, the motor M for the rolls 11, 12 is started to transport the sheet portion which was in register with the window 4 (and which bears a latent image of information 10*a*) into the next unit, i.e., adjacent the gas-filled interelectrode gap of an ionography imaging chamber or into a developing unit wherein the latent image is converted into a visible image by resorting to toner particles.

The reference character 5*a* denotes the location where the reflector is movably secured to the top wall 1A, e.g., by a hinge or the like.

The receptor sheet 2 (or at least that outer stratum of the sheet which is remote from the pane 4) consists of polyethylene terephthalate (PET) or polyvinyl chloride (PVC). It was found that the surfaces of such sheets can accumulate substantial potentials under the influence of electromagnetic radiation, under the influence of heating to a temperature exceeding 50° C., and/or in response to the application of mechanical pressure. When the surface of the sheet 2 is exposed to electromagnetic radiation, the potential is a negative potential and can exceed 200 volts. The accumulation of pronounced potentials is enhanced by mechanical changes at the respective surface of the sheet 2, especially by development of relief-like protuberances and roughened areas. The potential disappears with elimination of the mechanical deformation. If the sheet 2 consists of PET, mechanical deformation can be eliminated by heating the sheet to a temperature in excess of 60° C. for an interval of more than one minute. It is assumed that the potentials are effective toward the outside and develop, in the event of macromolecular deformation, in the border regions of disturbed zones.

The potential can be eliminated by heating to a temperature in excess of 60° C., by subjecting the sheet to the action of an AC corona discharge device or by cleaning the surface with a conductive liquid, such as alcohol. This elimination or neutralization may be performed at a location N situated upstream of the housing 1 as considered in the direction of movement of the receptor sheet 2, as indicated in FIG. 1 in phantom lines.

It was found that the provision of thin protective and/or cover layers on the exposed surface or surfaces of the sheet 2 does not affect the development of a latent image on the sheet during exposure to light issuing from the source 6. Experiments were carried out with dielectric receptor sheets which consisted of PET and were provided with thin coats of thermoadhesive material, such as a copolymer of styrene alkyl alcohol. The thickness of the coats was in the range of 3-5$\mu$, and the purpose of such coats was to enhance the fixing of toner particles under the action of heat in the course of the developing step. The just described multi-layer sheet 2 was exposed to radiation issuing from a flash unit with an output of 600 w/second and acting on an area of 120 $cm^2$ while the sheet was held in intimate contact with the information-bearing side of an original 10. The information 10*a* was in the form of black print or handwritten data. The heat which developed as a result of absorption of light by black data on the original 10 entailed a partial structural change of the sheet 2. The light issuing from the source 6 penetrated through the sheet 2 prior to reaching the original 10 at the upper side of the pressure plate 7. The resulting latent image was thereupon developed with toner particles (whose sensitivity was in the range of approximately 60 v). The developed latent image was clearly legible, and such image was thereupon fixed to the thermoadhesive coat of the sheet in the customary way.

Commonly owned German Offenlegungsschrift No. 2,641,552 discloses certain materials which can be used as thermoadhesive covers for a dielectric receptor sheet 2 which consists of PET or PVC. Such materials are applied to dielectric receptor sheets to form thermoadhesive coats for retention of toner particles during conversion of latent images into visible images. As mentioned above, a latent image is produced by heating the sheet to a temperature in excess of 50° C., and the image is thereupon erased by heating the sheet to a temperature in excess of 60° C. for an interval of time exceeding one minute. The materials which are used as coatings for a dielectric receptor sheet consisting of PET or PVC have a freezing point between 30° and 60° C., and a melting point between 100° and 200° C. When maintained at a temperature between the freezing and melting points, the material of the coat is of viscous or doughy consistency.

For the purposes of imaging the data 10*a* onto a selected portion of a sheet 2 in accordance with the present invention, the sheet 2 was made of PET and such sheet was provided with a coat or outer stratum also consisting of PET and having a freezing point of approximately 50° C. and a melting point of approximately 110° C. The melting and freezing points of the main body of the sheet were somewhat higher than the respective characteristics of the coat. When the coat is heated above 50° C., its exposed side accumulates an electrostatic potential. At the same time, the heating enhances the electrical conductivity of the material of the coat. The interval of exposure to heat was long enough to insure that the temperature of the coat rose above the freezing point for a period just long enough to enable the coat to accumulate an electrostatic potential which suffices to attract the toner particles during the developing stage. The heating step should not be too long, i.e., it should not result in such increase of conductivity of the coat that the accumulated electrostatic charge would be transferred to the main body portion of the dielectric receptor sheet and/or that the charge which accumulated in one portion of the coat would be free to flow into the adjacent portion of the coat owing to increased transverse conductivity of the coat. In other words, the intensity and duration of heating action should be selected with a view to insure that the electrostatic charges accumulate only in those regions which are adjacent to information 10*a* on the original and that such charges remain in the respective regions in spite of increased conductivity of the coat in a direction toward the main body portion of the dielectric receptor sheet as well as in the plane of the coat. Furthermore, the interval of heating must be selected with a view (and this applies for all methods wherein a heat image is formed and thereupon processed) to insure that the image which is obtained in response to heating cannot become blurred as a result of "melting" or "flowing apart". As a rule, the interval of heating is in the range of a few seconds; in the event of exposure to light issuing from an electronic flash unit, the interval of heating is normally less than $10^{-3}$ second.

In order to erase the latent image, i.e., to bring about electrostatic neutralization of the just discussed dielectric receptor sheet of PET with a thermoadhesive coat of PET, the sheet must be heated for an interval of time which suffices to insure that each and every portion or field of the coat is heated to a temperature at least slightly above the freezing point. It is preferred to heat the coat to a temperature which is at least 10° C. above the freezing point; however, care should be taken to avoid heating of any (even very small) portions of the surface of the coat to a temperature which reaches the melting point. Such heating would cause the material of the coat to "flow apart", i.e., excessive heating would entail a pronounced change of the shape of the foil. The just mentioned heating to a temperature which is at least 10° C. above the freezing point can be achieved, by intensive application of radiation or convection heat, within a few seconds (reference may be had to the first paragraph on page 28 of the aforementioned German Offenlegungsschrift). In order to insure a complete and uniform neutralization of charges, the heating of the sheet 2 can proceed for much longer intervals of time, as long as the temperature of the sheet does not reach or exceed the melting point. For example, the sheet can be heated for extended periods of time, without any danger of heating close to or above the melting point, by resorting to a heating plate whose temperature is regulated by a thermostat so that the sheet-contacting surface of the heating plate is invariably maintained at a temperature below the melting point of the material of the sheet.

An important advantage of the improved method and apparatus is that latent images of data on a suitable original can be obtained in a simple and time-saving manner. The latent images can be converted into permanent images by resorting to a conventional electrostatic developing technique. The permanent image can be formed on the sheet 2 or on a separate sheet in a manner well known from the art of xerography. If the permanent image is formed on the sheet 2, such sheet can be filed away to constitute a permanent record, or it can be evaluated by a physician or another competent person and the image erased after it has served the intended purpose. By way of example, the sheet can be used for the making of images of breasts or other parts of a human body while the sheet is confined in the gas-filled interelectrode gap of an ionography imaging chamber, and the information 10*a* can be applied to the sheet ahead of the imaging chamber, downstream of the imaging chamber or in the imaging chamber proper. The trend in the making of X-ray images is to reuse the dielectric receptor sheets. Reference may be had to commonly owned patent application Ser. No. 774,411 filed Mar. 4, 1977, now U.S. Pat. No. 4,103,159, by Orthmann which discloses an ionography imaging chamber one half of which defines a gas-filled interelectrode gap and another half of which serves for projection of the image onto a screen or onto a carrier sheet which is thereupon contacted by toner particles to furnish visible images.

It is preferred to heat the sheet 2 prior to introduction into the path which is defined by the guide members 1*a*–1*f* of the housing 1. This is especially desirable when the sheet 2 is to be reused because heating prior to imaging of the original 10 insures the elimination of any and all residual charges and thus guarantees that the latent image which is produced by light issuing from the source 6 will constitute an accurate replica of information 10*a* located in register with the window 3. As mentioned above, heating of the sheet 2 is carried out in such a way that the temperature of the sheet is above the freezing point but below the melting point, e.g., between 60° and 99° C. if the freezing point of the sheet 2 or its thermoadhesive toner-retaining coat is approximately 50° C. As also mentioned above, residual charges can be eliminated by subjecting the sheet to the action of an AC corona discharge device and/or by washing the sheet with alcohol or another conductive liquid. All that counts is to insure that the sheet is electrostatically neutralized before it reaches the imaging station below the light source 6.

When the improved apparatus is used in conjunction with an ionography imaging chamber (e.g., a chamber of the type disclosed in the aforementioned U.S. Pat. No. 4,021,668 which is incorporated herein by reference), the making of a latent image of the information 10*a* can take place simultaneously with exposure of another or second portion of the sheet 2 to object-modulated X-rays in the gap between the electrodes of the imaging chamber. A suitable barrier (e.g., a plate consisting of lead) can be used to shield the selected sheet portion below the window 3 from X-rays while the object is imaged onto the second portion of the sheet 2 ahead of or behind the window 3. The two latent images (namely the latent image which is obtained in response to exposure of sheet 2 to object-modulated X-rays and the latent image which is obtained in the apparatus of the present invention) are thereupon developed in one and the same developed apparatus. The information 10*a* need not necessarily constitute data pertaining to a patient, i.e., such information can constitute any form of data which are to be considered during evaluation of the primary image and are sufficiently important to warrant recording on the sheet 2 in a position to allow for their examination or observation simultaneously with evaluation of the primary image.

For example, the apparatus of the present invention can be installed ahead of the ionography imaging chamber which is disclosed in commonly owned copending application Ser. No. 720,577 filed Sept. 7, 1976, now U.S. Pat. No. 4,074,133, by Müller et al.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of our contribution to the art and, therefore, such adaptations should and are intended to be comprehended within the meaning and range of equivalence of the claims.

What is claimed is:

1. An electrophotographic method of imaging a sheet-like original having at least two types of image-forming zones of different light-absorptive properties onto a selected portion of a dielectric receptor sheet at least one stratum of which consists of a material selected from the group consisting of polyvinyl chloride and polyethylene terephthalate, comprising the steps of placing the original against the selected portion of the receptor sheet; exposing the selected portion of the receptor sheet and the original to electromagnetic radiation of such intensity that the temperature of those regions of the selected portion of the receptor sheet which are superimposed with one of the types of the image-forming zones is raised above that of the regions of the selected portion which are superimposed with the other type of the image-forming zones and above the freezing temperature of the material of the stratum to thus provide the receptor sheet with a latent electrostatic image of the original; and converting said latent image into a visible image.

2. A method as defined in claim 1, wherein said exposing step includes subjecting the receptor sheet and the original to radiation issuing from an electronic flash unit.

3. A method as defined in claim 1, wherein said exposing step is so performed as to raise the temperature of the material of the stratum of the selected portion of the receptor sheet above 50° C. for a short interval of time.

4. A method as defined in claim 1, wherein the receptor sheet transmits light and said exposing step includes directing electromagnetic radiation through the selected portion of the receptor sheet before such radiation reaches the original.

5. A method as defined in claim 1, further comprising the step of electrostatically neutralizing the selected portion of the receptor sheet, including uniformly heating the selected portion of the sheet for an extended interval of time to a temperature exceeding 60° C.

6. A method as defined in claim 5, wherein said interval is in the range of several seconds.

7. A method as defined in claim 1, further comprising the step of electrostatically neutralizing the selected portion of the receptor sheet, including effecting a relative movement between the sheet and an AC corona discharge device prior to said first mentioned step.

8. A method as defined in claim 1, wherein said exposing step includes heating said stratum to a temperature which is below the melting point of the material of said stratum.

9. A method as defined in claim 1, wherein said converting step comprises contacting said stratum with toner particles and said exposing step further comprises heating said stratum to said temperature for an interval of time which is long enough to enable said stratum to accumulate an electrostatic charge just sufficient to attract toner particles to said latent image.

10. A method as defined in claim 9, wherein said interval is shorter than the interval upon termination of which the transverse conductivity of said stratum rises to a value at which said electrostatic charge is equalized in said stratum.

11. A method as defined in claim 9, wherein the receptor sheet consists of said stratum and of a main body portion, and said interval is shorter than the interval upon termination of which the conductivity of said stratum and of said main body portion rises to a value at which the electrostatic charge is distributed in said main body portion.

12. A method as defined in claim 9, wherein said exposing step includes exposing the original and the receptor sheet to radiation issuing from a flash unit and said interval is less than $10^{-3}$ second.

13. A method as defined in claim 1, further comprising the step of electrostatically neutralizing the selected portion of the receptor sheet, including heating each portion of said stratum which was exposed to said radiation to a temperature above the freezing point but below the melting point of the material of said stratum.

14. A method as defined in claim 13, wherein said temperature exceeds the freezing point by approximately 10° C.

15. A method as defined in claim 1, further comprising the steps of exposing another portion of the receptor sheet to object-modulated X-rays in the gas-filled interelectrode gap of an ionography imaging chamber to provide said other portion of the receptor sheet with a latent electrostatic image of the object, and shielding said selected portion of the receptor sheet from X-rays in the course of said last mentioned exposing step.

16. A method as defined in claim 15, wherein said first mentioned exposing step is carried out simultaneously with said last mentioned exposing step.

17. A method as defined in claim 15, wherein the image-forming zones of the original represent information pertaining to the object which is imaged onto said other portion of the receptor sheet.

18. A method as defined in claim 15, further comprising the step of converting said last mentioned latent image into a visible image simultaneously with said first mentioned converting step.

19. A method as defined in claim 18, wherein said converting steps include contacting the receptor sheet with toner particles.

20. An electrographic method of imaging a sheet-like original having at least two types of image-forming zones of different light-absorptive properties onto a selected portion of a dielectric receptor sheet at least one stratum of which consists of a material selected from the group consisting of polyvinyl chloride and polyethylene terephthalate, comprising the steps of electrostatically neutralizing the selected portion of the receptor sheet, including contacting the selected portion of the sheet with a conductive liquid; placing the original against the selected portion of the receptor sheet; exposing the selected portion of the receptor sheet and the original to electromagnetic radiation of such intensity that the temperature of those regions of the selected portion of the receptor sheet which are superimposed with one of the types of the image-forming zones is raised above that of the regions of the selected portion which are superimposed with the other type of the image-forming zones and above the freezing temperature of the material of the stratum to thus provide the receptor sheet with a latent electrostatic image of the original; and converting said latent image into a visible image.

21. A method as defined in claim 20, wherein said liquid is alcohol.

22. Apparatus for imaging a sheet-like original having at least two types of image-forming zones of different light-absorptive properties onto a selected portion of a dielectric receptor sheet having at least one stratum consisting of a material selected from the group consisting of polyvinyl chloride and polyethylene terephthalate, comprising a housing having a light-transmitting window for said selected portion of the receptor sheet; means for maintaining one side of the selected portion of the receptor sheet in said window in contact with the original; and a source of electromagnetic radiation operative to illuminate said window and the original with an intensity and for an interval of time which are sufficient for raising the temperature of those regions of said selected portions of said receptor sheet which are superimposed with one of the types of the image-forming zones above that of the regions of said selected portion which are superimposed with the other type of the image-forming zones and above the freezing temperature of the material of the stratum, to thereby provide said selected portion of the receptor sheet with a latent electrostatic image of the original.

23. Apparatus as defined in claim 22, wherein said window is rectangular or square.

24. Apparatus as defined in claim 22, wherein said source includes a flash unit.

25. Apparatus as defined in claim 22, wherein the receptor sheet transmits light and said source is adjacent to the other side of said selected portion of the receptor sheet.

26. Apparatus as defined in claim 22, further comprising an ionography imaging chamber adjacent to said housing.

27. Apparatus as defined in claim 22, wherein said housing includes guide means defining an elongated path for the receptor sheet, and further comprising means for intermittently transporting the receptor sheet along said path, a portion of said path being adjacent to said window.

28. Apparatus as defined in claim 22, wherein the original is an information-bearing card.

29. Apparatus as defined in claim 22, wherein said maintaining means includes means for yieldably biasing the original against the selected portion of the receptor sheet.

30. Apparatus as defined in claim 29, wherein said biasing means includes a mobile pressure plate.

31. Apparatus as defined in claim 30, further comprising a light-transmitting pane in said window, said pane being disposed between said source and said selected portion of the receptor sheet, said selected portion and the original being disposed between said pane and said pressure plate.

* * * * *